United States Patent
Reutter (12)

(10) Patent No.: US 6,478,360 B1
(45) Date of Patent: Nov. 12, 2002

(54) CLOSURE FOR A REFUELING TANK OF A MOTOR VEHICLE

(76) Inventor: Heinrich Reutter, Theodor-Heuss-Strasse 12, D-71336 Waiblingen (DE)

(*) Notice: Subject to any disclaimer, the term of this patent is extended or adjusted under 35 U.S.C. 154(b) by 0 days.

(21) Appl. No.: 09/850,738

(22) PCT Filed: Nov. 18, 1999

(86) PCT No.: PCT/EP99/08848
§ 371 (c)(1),
(2), (4) Date: Jun. 27, 2001

(87) PCT Pub. No.: WO00/29239
PCT Pub. Date: May 25, 2000

(30) Foreign Application Priority Data

Nov. 18, 1998 (DE) .......................... 198 53 157
Jul. 7, 1999 (DE) .......................... 199 31 177

(51) Int. Cl.[7] .............................. B62D 25/00
(52) U.S. Cl. ........................ 296/97.22; 220/DIG. 33; 220/86.2
(58) Field of Search .................. 296/97.22; 220/210, 220/303, 86.2, DIG. 33, 295; 273/127 B (56) References Cited

U.S. PATENT DOCUMENTS

| | | | |
|---|---|---|---|
| 3,126,728 A | | 3/1964 | Nehls |
| 3,216,728 A | * | 11/1965 | Nehls ..................... 273/127 B |
| 4,102,472 A | * | 7/1978 | Sloan, Jr. ................... 220/295 |
| 4,107,961 A | * | 8/1978 | Evans ........................ 220/210 |
| 4,280,346 A | * | 7/1981 | Evans ........................ 220/210 |
| 4,676,390 A | * | 6/1987 | Harris .................. 220/DIG. 33 |
| 4,779,755 A | * | 10/1988 | Harris .................. 220/DIG. 33 |
| 4,795,054 A | * | 1/1989 | Brown .................. 220/DIG. 33 |
| 4,913,303 A | * | 4/1990 | Harris .................. 220/DIG. 33 |
| 4,944,425 A | * | 7/1990 | Kasugai et al. ...... 220/DIG. 33 |
| 5,361,924 A | * | 11/1994 | Muller ........................ 220/295 |
| 5,385,256 A | * | 1/1995 | Brown .................. 220/DIG. 33 |
| 5,732,842 A | | 3/1998 | Krause et al. |
| 5,829,620 A | * | 11/1998 | Harris et al. ......... 220/DIG. 33 |
| 5,904,057 A | * | 5/1999 | Abney et al. ......... 220/DIG. 33 |
| RE36,927 E | * | 10/2000 | Griffin et al. ........ 220/DIG. 33 |
| RE36,959 E | * | 11/2000 | Griffin ................. 220/DIG. 33 |
| 6,202,879 B1 | * | 3/2001 | Gericke ............... 220/DIG. 33 |
| 6,230,918 B1 | * | 5/2001 | Huynh et al. .......... 220/203.06 |
| 6,308,852 B1 | * | 10/2001 | Hagano et al. ...... 220/DIG. 33 |
| 2001/0007324 A1 | * | 7/2001 | Hagano et al. ............. 220/303 |

FOREIGN PATENT DOCUMENTS

| | | |
|---|---|---|
| DE | 29507621 U1 | 7/1995 |
| DE | 19501797 C2 | 3/1997 |
| DE | 19832910 A1 | 1/1999 |
| DE | 29814188 U1 | 2/1999 |
| DE | 19812384 A1 | 9/1999 |
| EP | 0621154 A1 | 10/1994 |
| EP | 0747254 A2 | 12/1996 |
| FR | 2785263 A1 * | 10/1998 |
| FR | 2764555 | 12/1998 |
| JP | 6485713 * | 3/1989 |

* cited by examiner

*Primary Examiner*—Kiran Patel
(74) *Attorney, Agent, or Firm*—Jones, Tullar & Cooper, P.C.

(57) ABSTRACT

The invention relates to a closure for a refueling tank of a motor vehicle. Said closure has a closure cap which can be fixed to a filler neck in a liquid and gas-tight manner. The upper cap part rests against the pipe surface of the filler neck via an annular seating surface equipped with a flat packing. The entry part axially protrudes from the cap part and can be fixed to the filler neck in an axial direction. The aim of the invention is to provide a simple structure, in terms of movement, for reliably achieving an axial connection between the cap part of such a closure and the filler neck. To this end, the entry part is provided with a contacting element which can be reciprocated in relation to an under cut or counter-profile of the filler neck.

31 Claims, 9 Drawing Sheets

CLOSURE FOR A REFUELING TANK OF A MOTOR VEHICLE

TECHNICAL FIELD

The present invention relates to a closure for a fuel tank of a motor vehicle having a closure cap fastenable in a liquid-tight or gas-tight manner to a filler pipe. The closure cap has an upper part being in contact with a seating surface of the filter pipe via an annular seating surface fitted with a flat seal and having on the cap part an axially projecting insertion part that is fastenable in an axially direction on the filler pipe.

BACKGROUND OF THE INVENTION

Known closures for fuel tanks of motor vehicles are connected with the filler pipe by means of either a screw or bayonet connection, by executing an inserting and rotating motion. Such closure motions are relatively awkward and complicated for automatic refueling systems to perform.

SUMMARY OF THE INVENTION

It is an object of the present invention to provide a closure of the type mentioned above for a fuel tank of a motor vehicle, wherein the closure cap is axially fastenable on the filler pipe by executing a simpler movement.

To achieve this object a closure of the above mentioned type for a fuel tank on a motor vehicle is provided according to which the insertion part is provided with a contacting element that can be moved back and forth relative to an undercut or counter-profile in the filler pipe.

By virtue of the measures according to the present invention, the fastening movement of the contacting element in the filler pipe is derived from the motion of inserting the insertion part into the filler pipe. As a result, a robot, for example, needs only to execute a simple movement in order to insert and fasten the closure cap in the filler pipe, or to detach and remove it from the filler pipe.

In a first preferred embodiment of the present invention, the contacting element is pivotally attached to the insertion point. In a further embodiment, provision is made for the contacting element to be a leg spring whose pivoting motion is derived from the axial motion of a sliding element. In other words, the motion of inserting the insertion part tensions the leg spring in such a manner that one of its legs is in contact against a lower edge of the filler pipe while its other leg is in contact against the outside of the plunger. In this way, the cap part, which is rigidly linked with the pivoting axis of the leg spring, is actively forced downwards and against the seating surface of the filler pipe. The axial excursion of the plunger out of the insertion part takes with it the second leg of the leg spring and thus causes the leg spring to pivot, thereby detaching itself from the filler pipe. Since the leg spring is then located within the insertion part, the entire closure cap can be removed from the filler pipe.

In accordance with a second and third embodiment of the present invention, the contacting element is radially movable and, according to, the arrangement whereby the contacting element is made up of radially movable bolts or a radially displaceable sealing ring, or also two thereof arranged one above the other, are provided. Preferred variants and embodiments in this respect are found in that the radial bolts are in contact with a lower edge of the filler pipe, or in that the sealing ring projects radially into a circumferential channel.

The movement of the radial bolt or sealing ring is obtained when the insertion part is made up of several elements and that the radial movement of the bolt or sealing ring is brought about by a radial relative movement between the individual elements of the insertion part or in that the radial movement of the bolt or sealing ring is brought about by a relative movement between the cap part and the insertion part, or in that, at its end, the insertion part is fitted with a sealing ring that is in radial contact with an area of the inner wall of the filler pipe, or in that the relative movement between the cap part and the insertion part and/or between the individual elements of the insertion part is brought about by means of a lever preferably a rocker lever or eccentric lever, or in that the relative movement between the cap part and the insertion part and/or between the individual elements of the insertion part is achieved by a rotating driving motion, or in that one element of the movement mechanism is connected to an individual element of the insertion part and the other element of the movement mechanism is rotatably or pivotably attached to the other element and abuts against the cap part.

The features whereby the circumferential edge of the cap part is arranged within a establishing edge of the filler pipe, the stabilizing edge surrounding and projecting above the seating surface of the filler pipe provided greater security to the extent that, in the event of a crash occurring ill this area of the motor vehicle, the closure cap is protected by the stabilizing edge of the filler pipe, so that in this case the cap is prevented from becoming detached.

In order to further simplify operation in those vehicles whose filler pipe is additionally covered over by a flap in the bodywork, which is almost always the case, a closure cap movably connected with the flap are preferably provided. By this means, when the flap is opened or closed fi-om outside, the closure cap can also be brought into the closed position in the filler pipe, or it can be removed again from the pipe. This can be accomplished in a wide variety of ways, for example by an electrical, pneumatic or similar connection. In accordance with an arrangement whereby the closure cap is connected with the flap, a mechanical connection in the form of a lever linkage is provided. In order also to guarantee safety in a crash, the lever linkage possessing a predetermined breaking point is provided. By this means, the flap becomes detached from the closure cap if there is any deformation of the bodywork in this area, so that the cap remains attached to the filler pipe.

According to a further preferred embodiment, the movement of the contacting element relative to the undercut or counter-profile of the filler pipe is taken from a thermo-chemical metal hydride actuator or from a thermal expansion element actuator. This additionally means that the insertion part can be fastened in or detached fi-om the filler pipe in a simple manner via a remote-controlled locking and unlocking system. In other words, in order to unlock or detach the insertion part from the filler pipe, the metal hydride actuator or the expansion-type actuator is thermally activated so that the closure can be removed by the robot, then following refueling and reinsertion of the insertion part in the filler pipe it can again be thermally deactivated, as a result of which a locking action takes place.

The thermal activation can be advantageously accomplished electrically via a thermal resistor, so that this procedure can be very simply initiated from inside the vehicle by operating a switch, or from any desired position by means of remote control.

The contacting element and the way in which it is moved can take many forms. For example, the movement and sealing action of the contacting element or its radially movable bolt can be configured according to the features whereby the bolts are connected with each other by an articulated lever arrangement which is moved by an actuator, or whereby the articulated lever arrangement on the side facing away from the actuator is acted on by a pressure spring, or whereby the bolts are acted on radially at their inner surfaces, and via an inclined arrangement of sliding surfaces by an axially movable positioning element driven by an actuator, or whereby the bolts are acted on at both sides by the oppositely inclined arrangements of sliding surfaces.

The way in which movement is imparted to one or more of the sealing rings of the contacting element and the arrangement of such ring or rings can be configured in that the sealing ring is mounted between the insertion part and the cap part which is axially movable relative thereto, and that between the cap part and the insertion part there is provided the actuator, and/or, in that an annular element is mounted between the cap part and the insertion part, and between this annular element and the cap part on the one hand and between the annular element and the insert part on the other hand, with a sealing ring arranged in each case.

Further details of the present invention may be taken fi-om the following description in which the present invention is described and explained in more detail on the basis of the embodiments depicted in the drawing.

DETAILED DESCRIPTION OF THE PREFERRED EMBODIMENTS

The closure 10, 110, 210, 310, 410, 510, 610 or 710 for a fuel tank of a motor vehicle, of which several embodiments are shown in the drawing, is designed in particular for automatic refueling operations, for which purpose a simplified sequence of motions when inserting a substantially cylindrical closure cap 11, 111, 211, 311, 411, 511, 611 or 711 into or removing it from the filler pipe 12, 112, 212, 312, 412, 512, 612 or 712 of the fuel tank, and for obtaining a liquid-tight, gas-tight and crash-proof seal with the filler pipe and for detaching the closure cap again fi-om the filler pipe, is achieved and guaranteed. This simplified closing and opening motion is reduced to a substantially purely translational motion of the closure cap into or out of the filler pipe In a preferred manner, to further simplify automatic refueling, a movement link 14, 514, 617 or 714 is provided between the closure cap 11, 111, 211, 311, 411, 511, 611 and 711 and a flap 13, 113, 213, 313, 413, 513, 613 or 713 forming part of the bodywork of the motor vehicle, and the translational motion of the closure cap is derived fi-om the pivoting motion of this flap. As shown in simplified form in the drawing, this link may be a mechanical connection 14, 514, 617 or 717, but it may also take the form of an electric-motor driven or pneumatic, or similar connection.

Figure 1A:
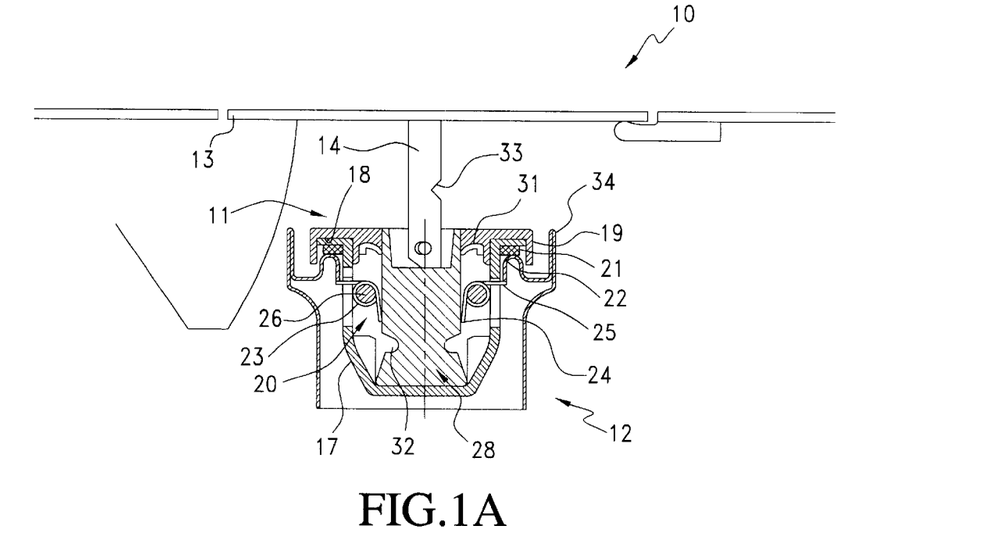
FIGS. 1A and 1B show a closure for a fuel tank of a motor vehicle according to a first embodiment of the present invention, in two different positions.
Figure 1B:
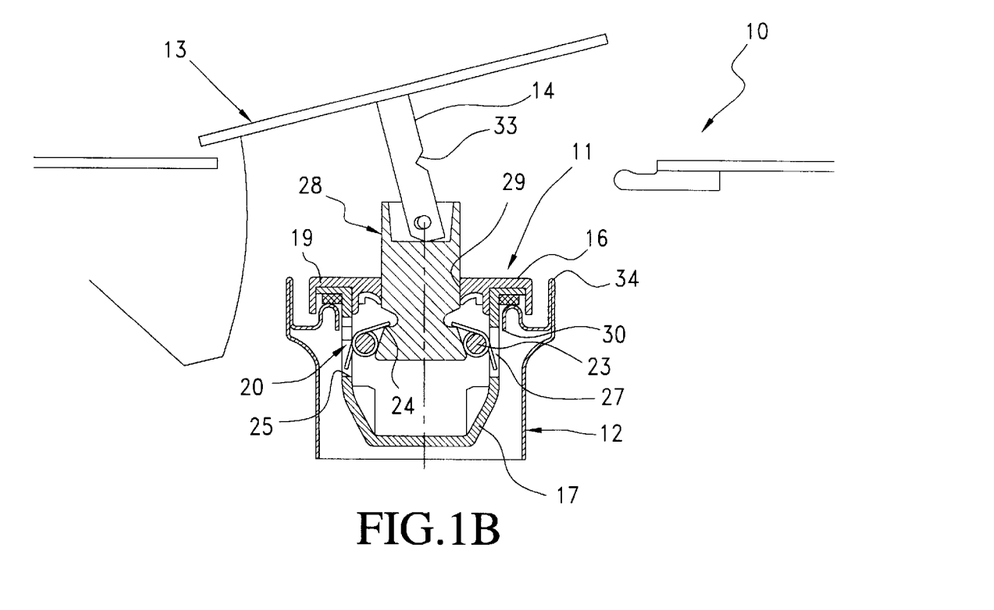

In accordance with FIGS. 1A and 1B, the closure cap 11 of the closure 10 possesses a flat cap part 16 which is rigidly connected to an insertion part 17 of smaller diameter. On its underside, the cap part 16 possesses an annular groove 18 in which the upper, flanged edge of the insertion part 17 is firmly held, for example clamped, and at this flanged edge 19 is fitted a flat sealing ring 21, with which the closure cap 11 rests tightly on a seating surface 22 of the filler pipe 12. In the housing-like cylindrical insertion part 17, whose front end is of conical configuration, there is pivotally mounted a contacting and locking element 20, here in the form of four leg springs 23 arranged in pairs diagonally opposite each other. The leg springs 23 are pivotably mounted on pins 26 rigidly fixed on the insertion part 17, in such a manner that their first leg 24 is oriented towards the inside of the insertion part 17 and their second leg 25 passes through or lies within a lateral, axial slot 27.

The closure cap 11 in addition possesses a plunger 28 that can be moved axially through the cap part 16 within the insertion part 17. The plunger 28 passes through a central borehole 29 in the cap part 16, against which latter part the plunger 28 is sealed by an inner sealing ring 31. At its front end, which is arranged within the insertion part 17, the plunger 28 possesses a circumferential groove 32 which opens conically towards the outer periphery of the plunger 28 and into which the first leg 24 of the leg spring 23 can enter.

At its other end, located outside the insertion part 17, the plunger 28 is connected to one end of a mechanical coupling 14, shown here merely in diagrammatic form, and the other end of this coupling is pivotably linked to the flap 13. The mechanical coupling 14 is provided with a predetermined breaking point 33 which, in the event of a crash, separates the connection between the plunger 28 and thus also the closure cap 11 and the flap 13. In this embodiment, the filler pipe 12 is provided with a stabilizing edge 34 concentrically surrounding its seating surface 22 and extending at least as high as the outer plane of the cap part 16, so that in the event of a crash the closure cap 11 is protected.

The insertion of the closure cap 11 into or its removal from the filler pipe 12 proceeds as follows: FIG. 1A shows the cap in its closed or sealed position in which the plunger 28 has been completely pushed into the insertion part 17 and the second legs 25 of the leg springs 23 of the contacting and locking element 20 are in pretensioned contact with the outer periphery of the plunger 28, above the circumferential groove 32, and the first legs 24 of the springs are in pretensioned contact with the lower annular edge 30 of the seating surface 22. This causes the insertion part 17 to be pulled downwards via the leg springs 23, so that the flat sealing ring 21 of the closure cap is actively pressed against the seating surface 22 of the filler pipe. This active contact is maintained if, for example, the predetermined breaking point 33 of the mechanical coupling 14 is separated in a crash. The closure cap 11 is detached from the filler pipe 12 by opening the flap 13 or by correspondingly pulling out the closure cap 11 by hand, so that, as shown in FIG. 1B, the second legs 25 of the leg springs 23 move into the area of the circumferential groove 32 and, because of their pretension, engage in the circumferential groove 32, so that the leg springs 23 pivot relative to each other, as indicated by the arrows A and A', and thus the first legs 24 of the springs disengage from the filler pipe 12 and move into the slots 27. Following this detaching step, the closure cap 11 can be withdrawn in a further step from the filler pipe 12, because the lower conical end of the plunger 28 comes up against the pivot pins 26 or the leg springs 23 and thus makes positive connection with the insertion part 17.

During the insertion motion of the closure cap 11 into the filler pipe 12, and after the cap part 16 comes to rest against the filler pipe 12, the plunger 28 continues to be moved axially inside the insertion part 17 so that, because of the engagement of the second legs 25 of the leg springs in the circumferential groove 32, the leg springs 23 pivot back again in the opposite direction and assume the position shown in FIG. 1A.

Figure 2A:
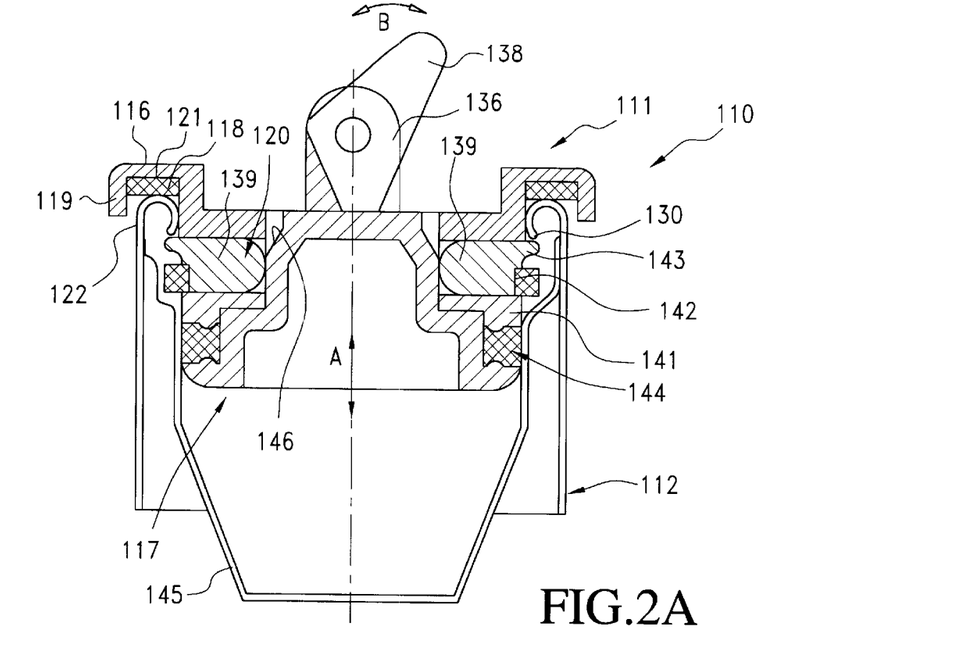
FIGS. 2A and 2B are illustrations similar to those in FIGS. 1A and 1B, however they are drawn to a larger scale and depict a second embodiment of the present invention.
Figure 2B:
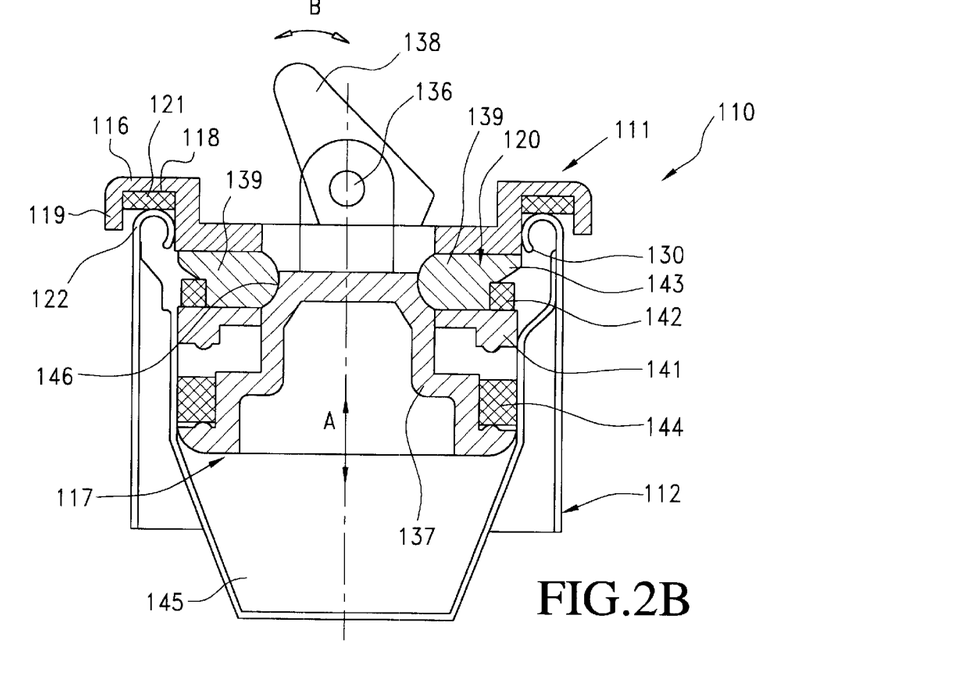

In the closure 110 illustrated in FIGS. 2A and 2B, the insertion part 117 of the closure cap 111 is made up of several elements and is movable relative to the cap part 116. In the cap part 116 the flat sealing ring 121 is positioned directly in the annular groove 118 on the underside of the cap. The cap part 116 is provided with a central opening for a tab 136 which is rigidly connected to a bell-shaped element 137 of the insertion part 117. To the tab 136 is pivotably attached a rocker lever 138 which rests on the cap part 116 and which, when it is moved in the direction indicated by the double arrow B, causes the bell-shaped element 137 of the insertion part 117 to move axially. Between the bell-shaped element 137 and the cap part 116 there is arranged a contacting and locking element 120 having the form of radially movable segments 139 uniformly distributed around the circumference, as well as an annular pressure element 141. The segments 139 are guided on the one hand by the annular pressure element 141 and on the other hand by the cap part 116. At their upper end facing the cap part 116, the segments 139, which are encircled in a peripheral area by an O-ring 142, possess a nose 143 by means of which they can engage under the annular edge 130 of the filler pipe 112 when the closure cap 111 is in the closed position (FIG. 2A). Opposite the annular pressure element 141, the bell-shaped element 137 is provided with a sealing ring 144 on which the pressure element 141 acts in order to achieve a sealing effect. In the area of the segments 139, the bell-shaped element 137 is provided with a curved surface 146 against which the inner ends of the segments 139 are in contact and via which the segments 139 are moved radially when the bell-shaped element 137 is moved relative to the segments 139 and to the pressure element 141.

Proceeding from FIG. 2B, which depicts the position in which the closure cap 111 can be withdrawn from the filler pipe 112, the rocker lever 138 is moved in the direction of the arrow B thus causing an upwards movement of the bell-shaped element 138 relative to the cap part 116. This upwards movement causes the segments 139 to move radially so that they engage beneath the annular edge 130 of the filler pipe 112, and furthermore the sealing ring 144 is compressed between the lower annular edge of the bell-shaped element 137 and the pressure element 141 so that a sealing effect is obtained against the inner circumferential surface of an inner skirt 145 of the filler pipe 112. In addition, although this is not shown in detail here, the positive connection between segments 139 and filler pipe 112 brings about a sealing effect of the O-ring 142 against the upper inner area of the skirt 145 of the filler pipe 112. FIGS. 2A and 2B depict (left and right) two variants of the design of the skirt 145 of the filler pipe 112 in this area below the seating surface 122 of the pipe.

It is understood that the closure cap 11 is detached from within the filler pipe 112 in appropriate reverse order, i.e. by moving the rocking lever 138 back. Even if the flap is not shown, it is understood that this movement of the rocker lever 138 can also be made to depend on the opening or closing of the flap.

Figure 2C:
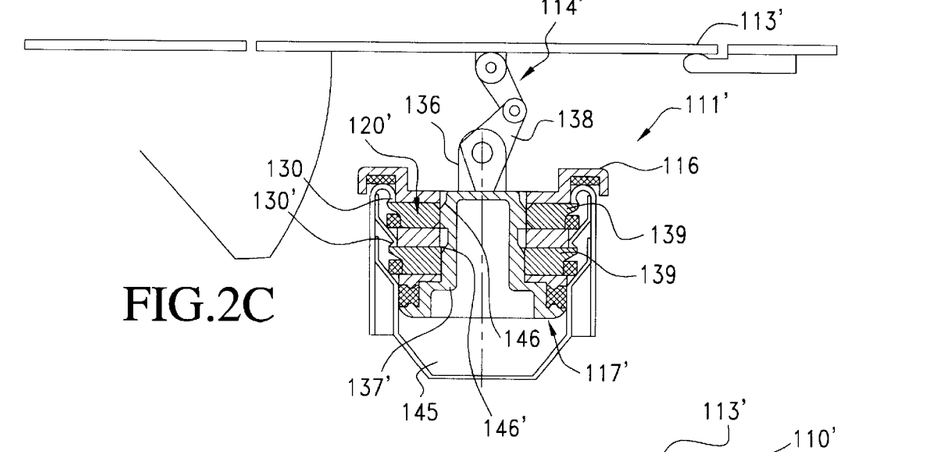
FIGS. 2C, 2D and 2E show a variant of the second embodiment depicted in FIGS. 2A and 2B, including a top view according to the arrows IIE in FIG. 2D.

FIGS. 2C, D and E depict a variant of the closure 110 shown in FIGS. 2A and 2B. This closure 110' differs from closure 110 substantially in that a further number of radially movable segments 139' of the contacting element 120 are arranged beneath the radially movable segments 139, and the annular pressure element 141' is arranged beneath the second movable segments 139' and an annular guide 140' is arranged between the first movable segments 139 and the second movable segments 139'. The radial movement of these second segments 139' towards the skirt 245 of the filler pipe is also derived, via appropriate curved surfaces 146', from the axial motion of the bell-shaped element 137' of the insertion part 117', said element being longer than the bell-shaped element 137 of the preceding variant. Since these second radially movable segments 139' also engage beneath an annular edge 130' arranged on the filler pipe 112' (FIG. 2C), an additional positive connection is obtained.

Figure 2D:
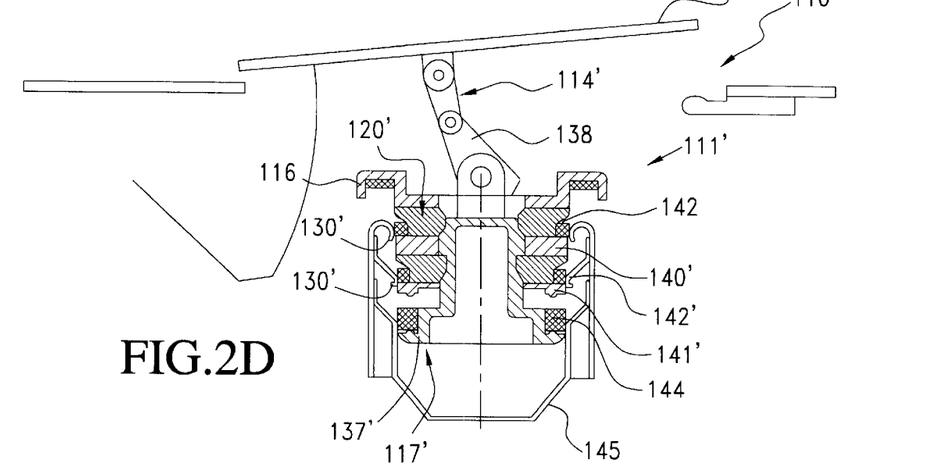
Figure 2E:
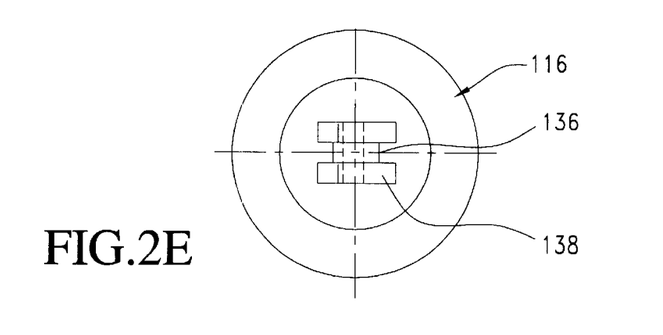

FIGS. 2C, D and E also exhibit a mechanical lever connection 133' between the closure cap 111' and flap 112'.

Figure 3A:
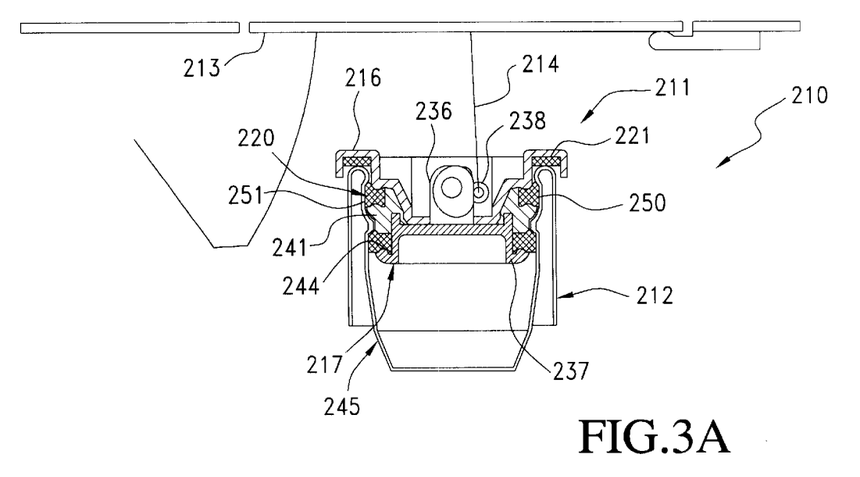
FIGS. 3A and 3B are illustrations corresponding to FIGS. 1A and 1B but depict a third embodiment of the present invention.
Figure 3B:
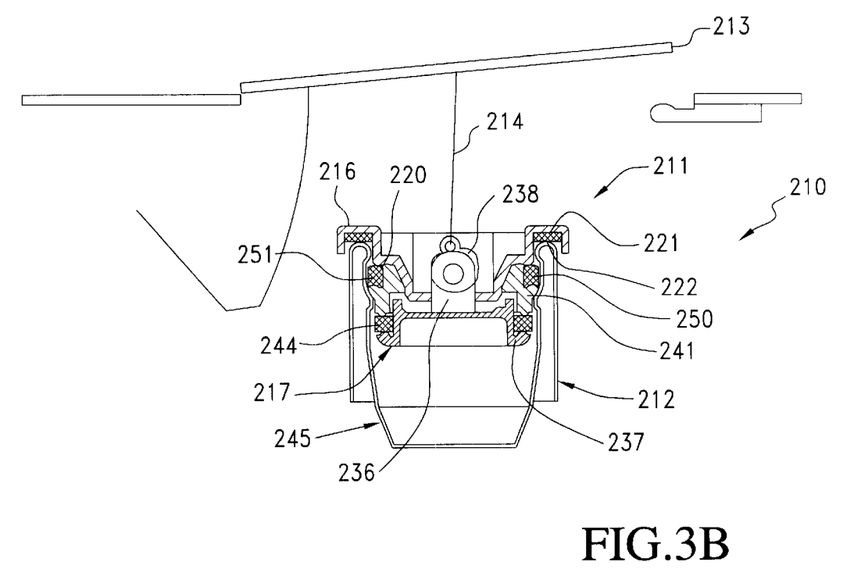

The closure 210 shown in FIGS. 3A and 3B differs from the closure 110 depicted in FIGS. 2A and 2B in that the segments 139 of the contacting element 120 are replaced by an appropriately configured sealing ring 250 of a contacting element 223, and both the bell-shaped element 237 of the insertion part 217 as well as the pressure element 241 are differently configured. In the embodiment illustrated, the edge of the cap part 216 is similar to that of cap part 116, but in the centre it is provided with a recess, the bottom of which is provided with a slot through which passes the tab 236 to which an eccentric lever 238 is pivotably attached. The recess is deep enough for both the tab 236 and the rocker lever 238 to be located within or below the upper surface of the cap part 216. When relative motion occurs between the cap part 216 and the pressure element 241 and the here almost cylindirical element 237, both the sealing ring 244 as well as the sealing ring 250 are axially acted upon, and the upper sealing ring 250 like the sealing ring 244 forms a seal against the inner circumference of the filler pipe 212, but in addition, the radially expanding area of the ring caused by the axial compression positively engages in a channel 251 in the skirt 245 of the filler pipe 212. In this way, similar to the case in the preceding embodiments, an axially firm or positive connection is achieved between the closure cap 211 and the filler pipe 212.

The movement sequences during the closing and opening, or between the insertion and withdrawal of the closure cap 211 into or from the filler pipe 212, are accomplished in the manner described above. Here, also, it is understood that the necessary pivoting movement of the eccentric lever 238 can be executed either manually or, as indicated, via a mechanical coupling 214 with the flap 213.

Figure 4A:
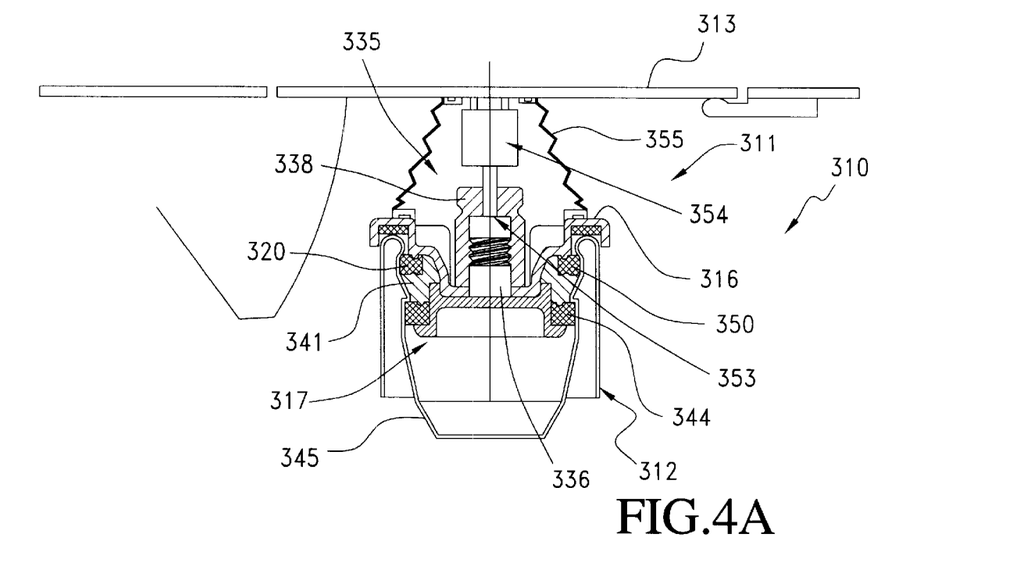
FIGS. 4A and 4B are illustrations corresponding to FIGS. 1A and 1B but depict a fifth embodiment of the present invention.
Figure 4B:
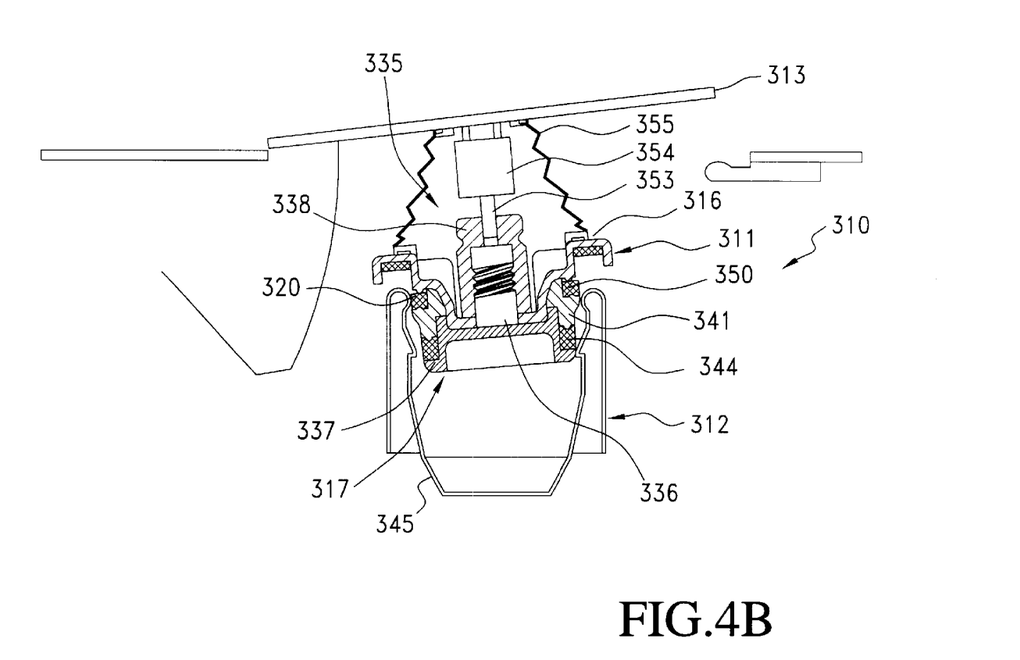

In the closure 310 depicted in FIGS. 4A and 4B the relative motion between the individual elements themselves of the insertion part 317 and between these elements and the cap part 316 is accomplished by means of a type of spindle drive 335. For this purpose, the element 337 of the insertion part 317 is provided with an externally threaded bolt 336 over which an internally threaded sleeve 338 engages, said sleeve being electrically or pneumatically driven and taking its rotational motion, for example, from the opening motion of the flap 313. As shown in these Figures, the output drive shaft 353 of an electric motor 354 pivotably attached to the flap 313 is connected in a rotationally rigid and axially movable manner with the internally threaded sleeve 338. The closure cap 311 is connected with the flap 313 via a rigid bellows 355 or a stable spring suspension in order to permit axial motion. Otherwise, the element 337 and the pressure element 341 of the insertion part 317 and the cap part 316 of the closure cap 311 have almost the indentical configuration to that found in the embodiment illustrated in FIGS. 3A and 3B. The same is true of the filler pipe 312, which is provided with the skirt 345 and with an appropriate channel 351.

Figure 5A:
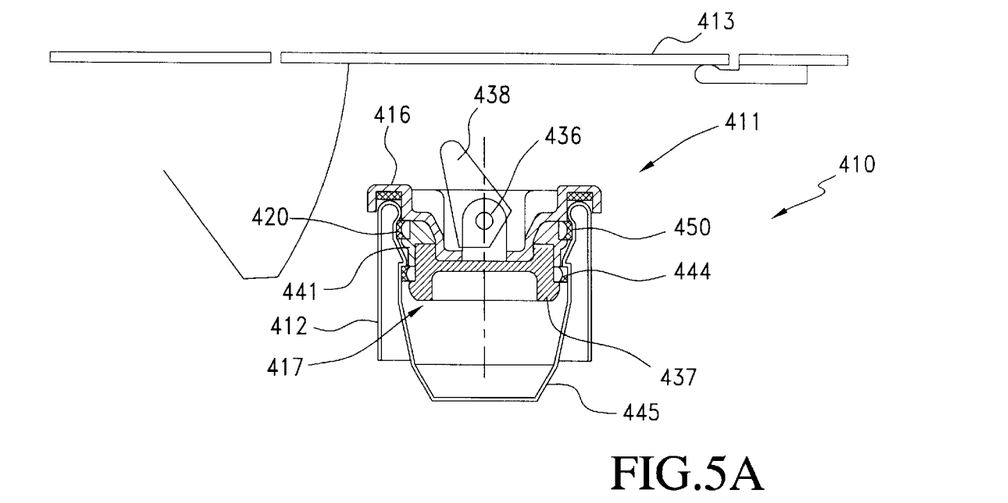
Figure 5B:
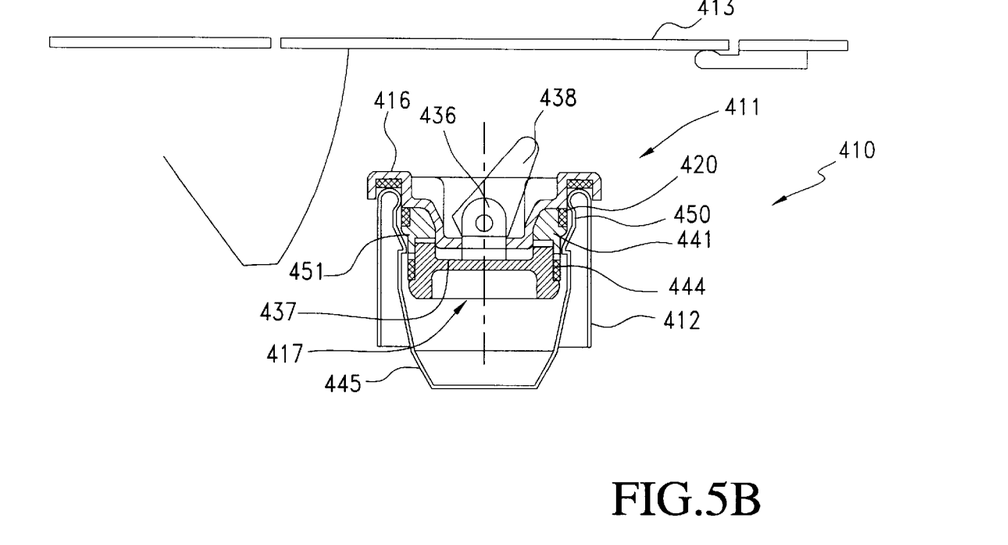

The embodiment of a closure 410 illustrated in FIGS. 5A and 5B differs from the embodiment shown in FIGS. 3A and 3B in that, firstly, instead of the eccentric lever a rocker lever 438, and instead of annular seals of square or round cross section an annular seal of strip-like, longitudinally rectangular cross section is provided. As seen in FIG. 5A, in the closed position the strip-shaped annular seal 444 and 450 bulges radially outwards. This also results in a positive connection between these sealing rings 444, 450 and the channel 451 incorporated into the skirt 345 of the filler pipe 412.

In the embodiments illustrated in FIGS. 6A to 8, as in the embodiments shown in FIGS. 2 to 5, provision is made for the simplified closing and opening movement to be reduced to a substantially purely translational movement of the closure cap and to a radial movement of a contacting and locking element 520, 620 or 720 arranged in the closure cap 511, 611 or 711. The radial movement of the contacting and locking element 520, 620 or 720 is, however, taken from the preferably axial movement of an actuator 515, 615 or 715 in the form either of a thermochemical metal hydride actuator or in the form of a thermal expansion element. The thermal actuator 515, 615 or 715 is connected to an electrical thermal resistor, which can be switched on or electrically energized by operating a switch located inside the motor vehicle or by remote control, in order to activate the actuator. For the movement connection 514, 614 or 714 between the closure cap 511, 611 or 711 and the [flap] a servomotor can be operated to open the flap 513, 613 or 713, for example with a delay, by electrically activating the actuator 515, 615 or 715. Correspondingly, the return movement of the flap by means of the servomotor is followed, at a staggered interval, by the deactivation of the actuator once the closure cap has been introduced into the filler pipe.

Figure 6A:
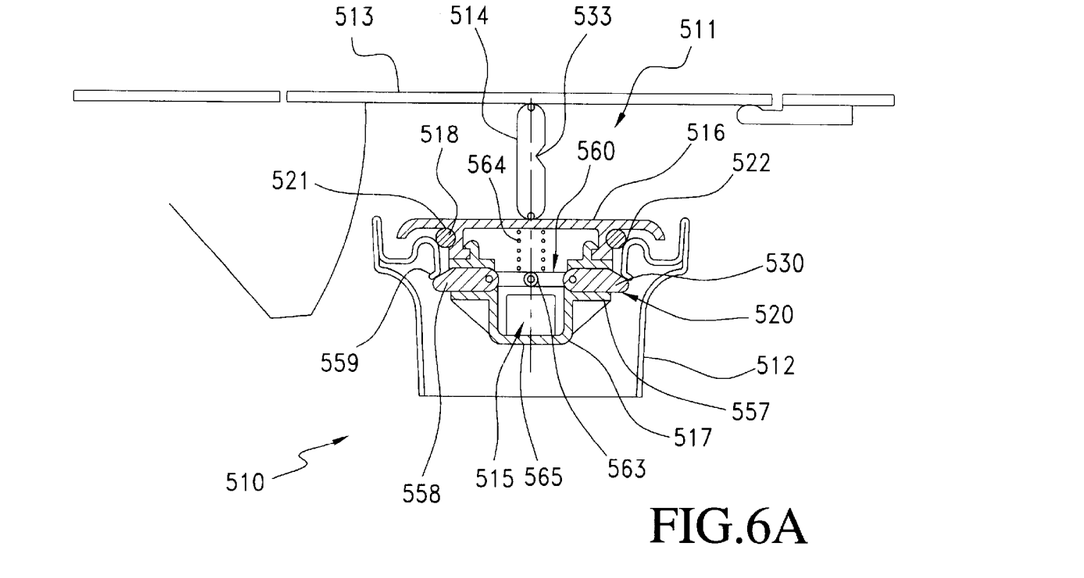
FIGS. 6A and 6B depict a closure for a fuel tank of a motor vehicle according to a sixth embodiment of the present invention, in two different positions.
Figure 6B:
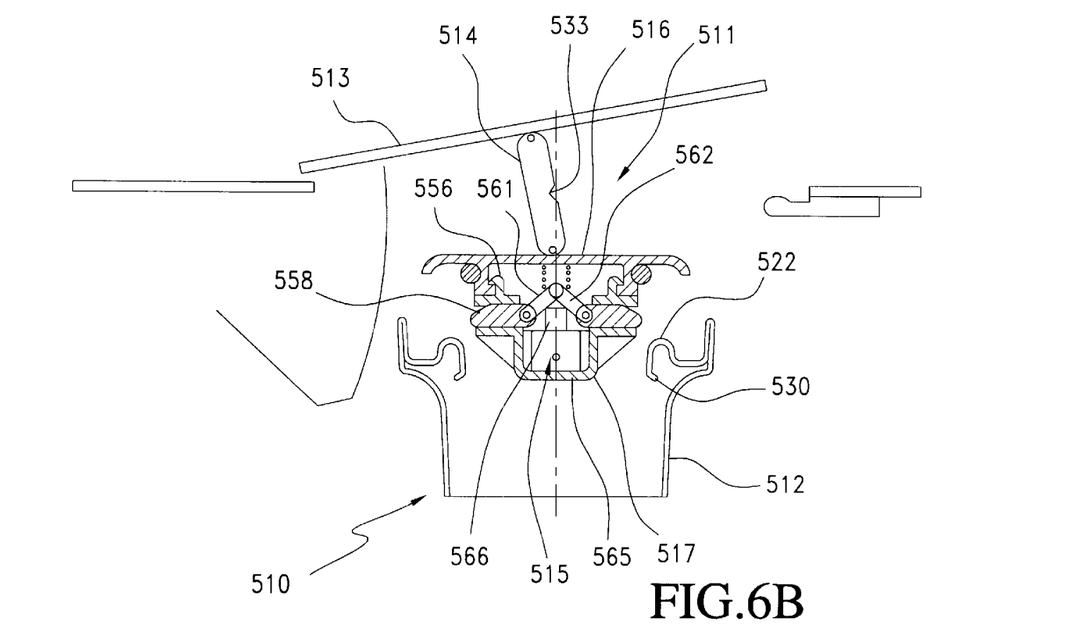

As shown in FIGS. 6A and 6B, the closure cap 511 of the closure 510 possesses a flat cap part 516 which is rigidly attached to an insertion part 517 of smaller diameter. The cap part 516 is provided on its underside with a concave annular groove 518 in which is positioned a sealing ring 521, with which the closure cap 511, in the closed position, is in sealing contact with the seating surface 522 of the filler pipe 512, as shown in FIG. 6A. The seating surface 522 is part of an inward flanged edge of the filler pipe 512.

The insertion part 517, which is mounted suspended by means of detent elements 556 on the underside of cap part 516, possesses two or more radial openings 557 distributed over the periphery in which there are arranged radially movable contacting and locking elements 520 each in the form of a locking slide 558. The radial outer ends of the locking slides 558 possess an inclined surface 559 with which, when the closure 510 is in the closed position, they engage beneath a lower bent annular edge 530 of the seating surface 522 of the filler pipe (FIG. 6A). At their radial inner ends, the two locking slides 558 are connected to an articulated lever arrangement 560, the levers 561 and 562 of which are articulatedly connected on the one hand with the respective locking slide 558, and on the other hand with each other. One end of a pressure spring 564 is supported at the articulated Joint 563 of the two levers 561 and 562, which are of equal length, while the other end of the spring is in contact with the underside of the cap part 516. Between the articulated joint 563 and the bottom 565 of the insertion part 517, and facing away from the pressure spring 564, there is located the thermal actuator 515 having an axial plunger 566 which can exert pressure against the articulated joint 563 counter to the pressure spring 564.

The thermal actuator 515 is capable of converting thermal energy directly into potential energy and it takes the form either of a thermochemical metal hydride actuator or of a thermal expansion element (containing for example wax). This thermal actuator 515 is activated by applying electric current to a thermal resistor which is thermally coupled, in a manner not shown, to the thermal actuator 515.

The movement link between the flap 513 and the cap part 516 is provided in the form of a merely diagrammatically depicted mechanical coupling 514, which is pivotably connected on the outside to the cap part 516 and on the inside to the flap 513. A coupling element possesses a predetermined breaking point 533 which separates the connection between the closure cap 511 and the flap 513 in the event of a crash. In a manner not depicted here, the flap 513 may be opened and closed with the aid, for example, of a servomotor.

The procedure of locking the closure cap 511 or its insertion part 517 to and detaching it from the filler pipe 512 is as follows:

FIG. 6A depicts the closed or sealed position in which the insertion part 517 of the closure cap 511 is located inside the filler pipe 512 and is locked to it, fixed against axial movement, and also in this position the cap part 516 of the closure cap 511 is in sealing contact with the seating surface 522 of the filler pipe 512. In this closed position the thermal actuator 515 is in its retracted, deactivated position. If the filler pipe 512 needs to be opened to permit automatic refuelling of the vehicle, the thermal actuator 515 is activated, by means of a switch inside the vehicle or by remote control, in such a manner that voltage or current is applied to the thermal resistor—not depicted—so that the thermal resistor heats up and gives off its heat to the thermal actuator 515, thus causing plunger 566 thereof to move axially. The positioning force of the thermal actuator 515 overcomes the pressure force of the pressure spring 564 so that, as shown in FIG. 6B, the articulated lever arrangement 560 is displaced against the action of the pressure spring 564, thereby causing the locking slides 558 to move radially inwards and as a result to disengage from the lower annular edge 530 of the seating surface 522. The closure cap 511 is now detached or free from filler pipe 512. Through the mechanical movement link 514, the closure cap 511 can be lifted out of and away from the filler pipe 512 by pivoting the flap 513 so that the filler pipe 512 is freely accessible for automatic robot refuelling (or also for manual refuelling). The locking closing of the filler pipe 512 by means of the closure cap 511 takes place in the reverse order, i.e. when the flap 513 is closed, the closure cap 511 is moved onto and into the filler pipe 512. Once this process of inserting the cap is completed, the thermal actuator 515 is again deactivated, so that as the metal hydride actuator or the expansion element cools down, it gradually loses its positioning force, so that the pressure spring 564 is able to return the articulated lever arrangement 560 and thus the locking slides 558 to their position as shown in FIG. 6A.

Figure 7A:
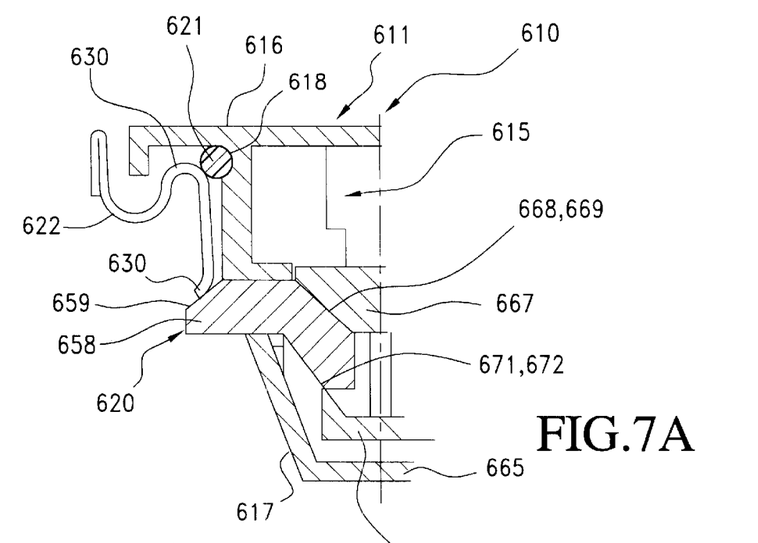
FIGS. 7A, 7B and 7C are in each case similar to FIG. 6A, but show incomplete or different positions, as well as a top view of the contacting and locking element according to a seventh and eighth embodiment of the present invention.

FIG. 7A shows a configuration of the closure cap 611 that is similar to the design of the closure cap shown in FIGS. 6A and 6B. In this embodiment as well, the cap part 616 and the insertion part 617 are rigidly connected with one another, and in the insertion part 617 or between the insertion part 617 and the cap part 616 there are provided radial openings 657 in which radial locking slides 658 are radially movable and engage with their inclined surfaces 659 beneath the annular edge 630 of the seating surface 622 of the filler pipe. The way in which the radial motion of the locking slides 658 is activated differs from the preceding embodiment. For this purpose, at their radial inner surfaces the locking slides 658 possess sliding surfaces 669 and 672 running at an inclined angle both upwards and downwards and interacting with corresponding sliding surfaces 668 and 671 of an axially movable first positioning element 667 or a second positioning element 670. At one of its ends, the upper positioning element 667 is acted on by the thermal actuator 615 and at its other end it is rigidly connected to the second positioning element 670.

The locking and unlocking of the closure cap 611 inside the filler pipe 512 is also accomplished by activating and deactivating the thermal actuator 615 in such a way that, in this case, when deactivation occurs, the locking slides 658 disengage from the seating surface 622 of the filler pipe, whereas when the thermal actuator 615 is activated, locking as shown in FIG. 7A takes place. It is understood that when the thermal actuator 615 is arranged between the second positioning element 670 and the bottom 665 of the insertion part 617, or when the pairs of sliding surfaces 668, 669 and 671, 672 are inclined in the other direction (upwards in FIG. 7A), the thermal actuator 615 must be deactivated in order to detach the insertion part 617, and for the locking position of the closure cap 611 in the filler pipe 612.

Figures 7B, 7C:
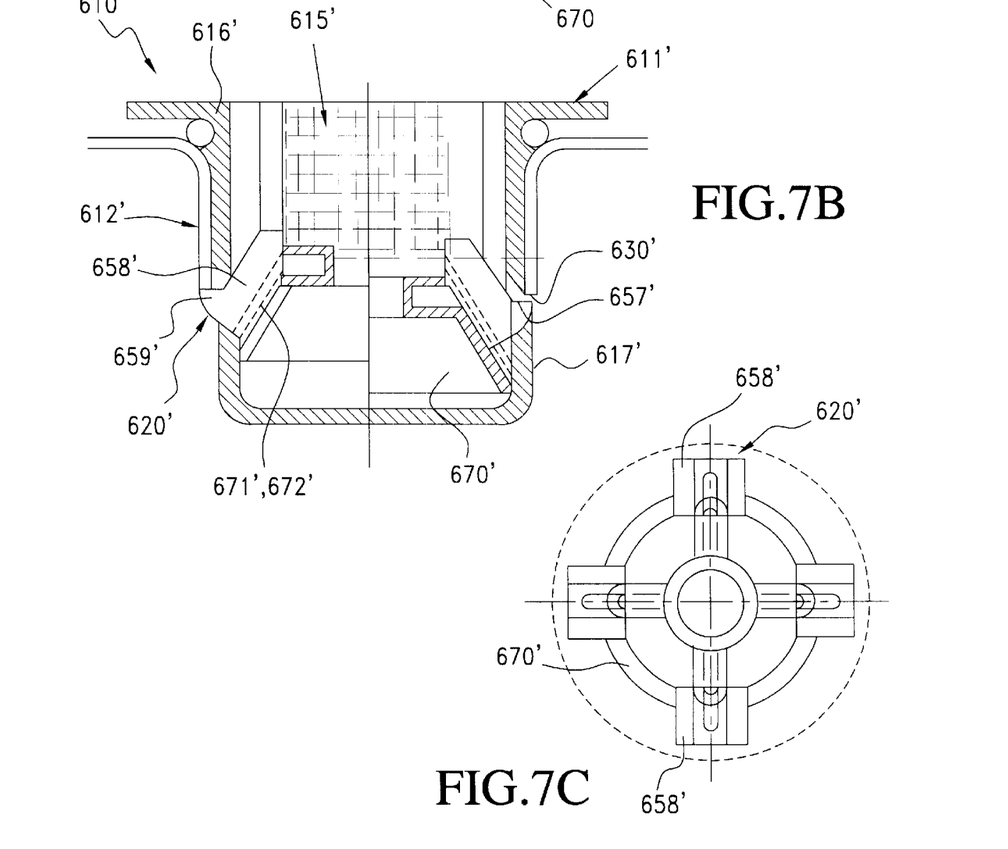

FIGS. 7B and 7C illustrate a closure cap 611' of this type. In this case, the contacting and locking element 620' possesses four locking slides 658' uniformly distributed around the periphery, said slides being preferably inclined at an angle of about 30° towards the longitudinal centre axis of the closure 610' and they are guided on a lower positioning element 670'. For this purpose, the locking slides 658' and the lower positioning element 670' possess contiguous grooved or spring-loaded sliding surfaces 671' or 672'. The thermal actuator 615' is located on the one hand on the upper surface of the lower positioning element 670' and on the other hand is supported against the cap part 616', in a manner not depicted in detail here. The insertion part 617', which is of one-piece construction with the cap part 616', possesses radial slots 657' through which the nose-like ends 659' of the locking slides 658' project.

The left side of FIG. 7B shows the locking position of the locking slides 658' beneath the annular edge 630' of the filler pipe 612' with the thermal actuator 615' deactivated. If the thermal actuator 615' is activated, the lower positioning element 670' is moved downwards as shown in the right half of FIG. 7B, and as a result the locking slides 658' move downwards and inwards and conseqently their nose-shaped ends 659' disengage from the lower edge 630' of the filler pipe. This sliding motion is supported by a lower inclined sliding surface on the slots 657'. The closure cap 611' can thus, as described for the other embodiments, be removed from the filler pipe 612'. When the thermal actuator 615' is deactivated, the lower positioning element 670' moves upwards, said movement being possibly supported or also executed by means of a pressure spring not depicted here.

Figure 8A:
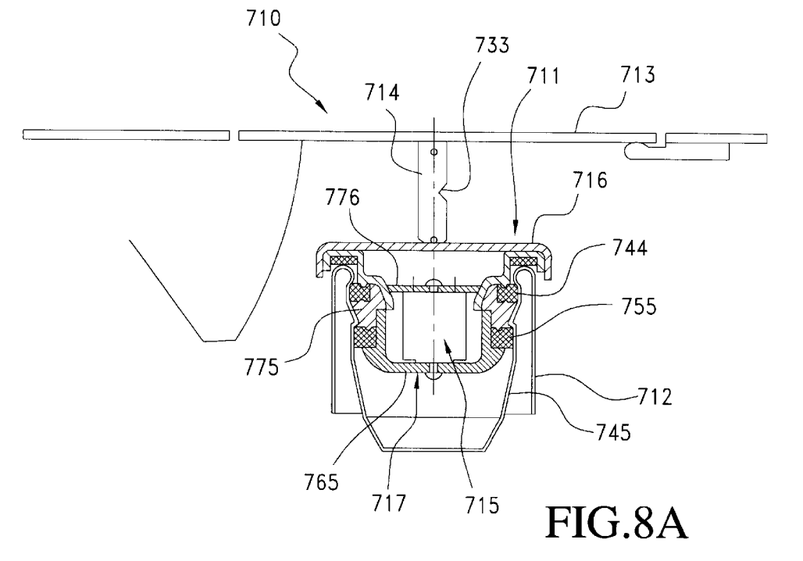
FIGS. 8A and 8B are illustrations similar to FIGS. 6A and 6B, but depict a ninth embodiment of the present invention.
Figure 8B:
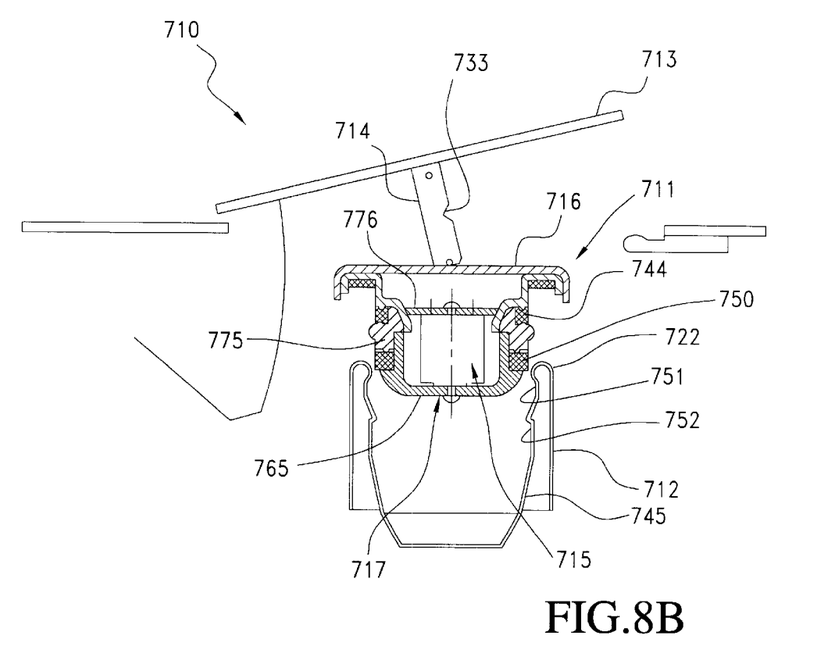

In the embodiment of the closure 710 illustrated in FIGS. 8A and 8B, the cap part 716 provided on its underside with a flat sealing ring 621 which, in the closed position, is in contact with the concavely curved seating surface 622 of the filler pipe (FIG. 8A). The filler pipe is shaped in such a way that a tapering skirt element 645, which accepts the insertion part 617, is formed as an extension of the seating surface 622 of the filler pipe and is provided here with, for example, two axially spaced annular channels 751.

In this embodiment, the cap part 716 and the insertion part 717 are guided in axial motion in relation to each other. An annular element 755 is guided in axial motion between the cap part 716 and the insertion part 717. Between the cap part 716 and the annular element 775 on the one hand, and the annular element 775 and the insertion part 717 on the other hand, there is respectively provided an annular seal 744 or 750. The annular seals 744 and 750 are designed and arranged in such a manner that when the closure cap parts 716, 775 and 717 undergo axial motion the annular seals between them expand in a radial direction and can enter into the annular channels 751, 752 to form a sealing and axially locking engagement.

The thermal actuator 715 is located between the bottom 765 of the insertion part 717 and an intermediate bottom element 776 of the cap part 716, which is something that can also be done in the embodiment shown in FIG. 7.

In order to open the closure 710, starting from the closed position shown in FIG. 8A, the thermal actuator 715 is activated as described above, and because of the resulting positioning forces and the travel distance the cap part 716 and the insertion part 717 are caused to move relative to each other, i.e. apart. More accurately expressed, the insertion part 717 is moved axially away from the cap part 716. This releases the axial pressure on the sealing rings 744, 750, so that these sealing rings move radially back and out of the respective annular channel 751, 752 in the skirt 745 of the filler pipe 712. With the ring seals 744 and 750 in this position (FIG. 8B), the closure cap 711 can be withdrawn and removed from the filler pipe 712.

This occurs in the manner described for FIGS. 6A, 6B. During this process, and while the vehicle's tank is being refuelled either automatically or by hand, the thermal actuator 715—it should be mentioned once more—remains activated. The closing and locking of the closure cap 711 in the filler pipe 712 occurs in the appropriate reverse order: Once the closure cap 711 has been inserted into the filler pipe 712, the thermal actuator 715 is deactivated so that, due to the cooling of the thermal actuating element the positioning forces act in the opposite direction. As a result, because the fixed end of the thermal actuator 715 is firmly attached to the bottom 776 of the cap part 716 and also the movable positioning plunger of the actuator is firmly attached to the bottom 765 of the insertion part 717, the insertion part 717 is retracted in the direction of the cap part 716, thereby compressing the sealing rings 744, 750 and moving them radially into the annular channels 751, 752 to achieve locking. In this embodiment as well, at a predetermined time interval, the activation of the thermal actuator 715 can be followed by the movement of the flap 713 connected to the closure cap 711, and the aforementioned movement of the flap 713 can be followed by the deactivation of the thermal actuator 715.

What is claimed is:

1. A closure for a fuel tank of a motor vehicle, having a closure cap fastenable in a liquid-tight or gas-tight manner to a filler pipe, the upper part of said cap being in contact with a seating surface of the filler pipe via an annular sealing surface fitted with a flat seal and having on the cap part an axially projecting insertion part that is fastenable in an axial direction on the filler pipe, wherein said insertion part is provided with a contacting element that can be moved back and forth relative to an undercut or counter-profile in the filler pipe.

2. A closure according to claim 1, wherein said contacting element is pivotably mounted on said insertion part.

3. A closure according to claim 2, wherein said contacting element is formed by leg springs uniformly distributed circumferentially, one of said spring legs being in contact with a lower edge of the filler pipe, and the other of said spring legs being in contact with said insertion part.

4. A closure according to claim 1, wherein said insertion part has the form of a housing in which an axially movable plunger is accommodated.

5. A closure according to claim 4, wherein the untensioned state said leg springs is arranged with its second leg in a radial opening in said housing and its first leg in a recess in said plunger.

6. A closure according to claim 4, wherein said leg springs are pivotably mounted within said housing.

7. A closure according to claim 5, wherein said plunger executes an axial opening movement, said first leg of said leg springs loses its tension and moves into said recess of said plunger and initiates the pivoting movement of said leg springs.

8. A closure according to claim 3, wherein said plunger is guided in said cap part and is sealed at the inside thereof.

9. A closure according to claim 1, wherein said contacting element is radially movable.

10. A closure according to claim 9, wherein said contacting element is made up of radially movable bolts uniformly distributed circumferentially.

11. A closure according to claim 10, wherein said radial bolts are in contact with a lower edge of the filler pipe.

12. A closure according to claim 9, wherein said contacting element is formed by an axially compressible and radially expanding sealing ring.

13. A closure according to claim 12, wherein said sealing ring projects radially into a circumferential channel on the filler pipe.

14. A closure according to claim 9, wherein said insertion part is made up of several elements, and wherein the radial movement of a bolt or sealing ring is brought about by a radial relative movement between the individual elements of said insertion part.

15. A closure according to claim 9, wherein the radial movement of a bolt or sealing ring is brought about by a relative movement between said cap part and said insertion part.

16. A closure according to claim 9, wherein at its end, said insertion part is fitted with a sealing ring that is in radial contact with an area of the inner wall of the filler pipe.

17. A closure according to claim 9, wherein the relative movement between said cap part and said insertion part and/or between the individual elements of said insertion part is brought about by means of a lever, preferably a rocker lever or eccentric lever.

18. A closure according to claim 9, wherein the relative movement between said cap part and said insertion part and/or between the individual elements of said insertion part is achieved by a rotating driving motion.

19. A closure according to claim 17, wherein one element of the movement mechanism is connected to an individual element of said insertion part and the other element of the movement mechanism is rotatably or pivotably attached to the other element and abuts against said cap part.

20. A closure according to claim 1, wherein the circumferential edge of said cap part is arranged within a stabilizing edge of the filler pipe, said stabilizing edge surrounding and projecting above the seating surface of the filler pipe.

21. A closure according to claim 1, wherein a bodywork flap is provided for covering the filler pipe, and wherein said closure cap is movably connected with said flap.

22. A closure according to claim 21, wherein said closure cap is connected with said flap via a lever linkage.

23. A closure according to claim 22, wherein said lever linkage possesses a predetermined breaking point.

24. A closure according to claim 1, wherein the movement of said contacting element relative to the undercut or counter-profile of the filler pipe is taken from a thermochemical metal hydride actuator or from a thermal expansion element actuator.

25. A closure according to claim 10, wherein said bolts are connected with each other by an articulated lever arrangement which is moved by an actuator.

26. A closure according to claim 25, wherein the articulated lever arrangement on the side facing away from said actuator is acted on by a pressure spring.

27. A closure according to claim 10, wherein said bolts are acted on radially at their inner surfaces, and via an inclined arrangement of sliding surfaces, by an axially movable positioning element driven by said actuator.

28. A closure according to claim 27, wherein said bolts are acted on at both sides by two oppositely inclined arrangements of sliding surfaces.

29. A closure according to claim 12, wherein said sealing ring is mounted between said insertion part and said cap part, which is axially movable relative thereto, and that between said cap part and said insertion part there si provided said actuator.

30. A closure according to claim 29, wherein an annular element is mounted between said cap part and said insertion part, and between said annular element and said cap part on the one hand, and between said annular element and the insertion part on the other hand, there is in each case arranged a sealing ring.

31. A closure according to claim 24, wherein said actuator is activated via an electric thermal resistor.

* * * * *